(12) United States Patent
Shavitt et al.

(10) Patent No.: US 8,345,685 B2
(45) Date of Patent: Jan. 1, 2013

(54) METHOD AND DEVICE FOR PROCESSING DATA PACKETS

(75) Inventors: Yuval Shavitt, Raanana (IL); Shai Eshet, Hod Hasharon (IL)

(73) Assignee: Ethernety Networks Ltd, Lod, IL (US)

( * ) Notice: Subject to any disclaimer, the term of this patent is extended or adjusted under 35 U.S.C. 154(b) by 141 days.

(21) Appl. No.: 11/423,416

(22) Filed: Jun. 9, 2006

(65) Prior Publication Data

US 2007/0286194 A1 Dec. 13, 2007

(51) Int. Cl.
*H04L 12/56* (2006.01)
(52) U.S. Cl. .......................... 370/392; 711/159; 711/216
(58) Field of Classification Search .......................... None
See application file for complete search history.

(56) References Cited

U.S. PATENT DOCUMENTS

| | | | | |
|---|---|---|---|---|
| 5,032,987 A * | 7/1991 | Broder et al. | ................. | 711/221 |
| 6,862,287 B2 * | 3/2005 | Brown | .......................... | 370/401 |
| 2003/0210689 A1 * | 11/2003 | Davis et al. | .................... | 370/389 |
| 2004/0083347 A1 * | 4/2004 | Parson | ........................... | 711/165 |
| 2004/0133735 A1 * | 7/2004 | Sunaga et al. | ................. | 711/105 |
| 2005/0108460 A1 * | 5/2005 | David | ............................... | 711/5 |
| 2006/0179071 A1 * | 8/2006 | Panigrahy et al. | ............ | 707/101 |

* cited by examiner

*Primary Examiner* — Brian Roberts
(74) *Attorney, Agent, or Firm* — Reches Patents

(57) ABSTRACT

A device and a method for processing a data packet. The method includes: receiving a key, applying multiple hash functions to provide multiple hashed values; accessing a group of hash tables using the multiple hashed values; associating between the key and an accessed vacant entry of an hash table out of the group of has tables. The device includes a communication controller connected to at least one memory bank; wherein the communication controller is adapted to receive a key associated with a data packet, apply multiple hash functions to provide multiple hashed values; access a group of hash tables stored within the at least one memory bank, using the multiple hashed values; and determine a data packet processing operation in response to a content of accessed entries of the multiple hash tables.

24 Claims, 6 Drawing Sheets

Device 100

METHOD AND DEVICE FOR PROCESSING DATA PACKETS

FIELD OF THE INVENTION

The present invention relates to methods and devices performing advanced search mechanisms to process data packets and perform various searches on a data packet especially for forwarding data packets by layer two switches.

BACKGROUND

Communication devices such as but not limited to routers and switches manage multiple flows of data. These data flows include multiple data packets that include data payloads as well as control information (also referred to as routing information) fields. The control information fields can be located in the header of the data packets but this is not necessarily so. The format of the control information depends upon the protocol stack that is being used by the communication device. In many cases the control information is included within first 160 bytes of a packet holding information of Layer two to Layer seven (referring to the OSI model).

A communication device, including a layer two or higher switch or other communication device, receives a data packet, extracts control information, processes the control information in order to decide how to process the data packet and eventually processes the data packet. The processing of the control information can include a classification stage and a forwarding stage. While classification involves applying flow control rules or policing, and forwarding may determine the queue that will receive the data packet as well as determining the output port of the communication device through with the data packet is to be sent.

The processing of the data packet can include terminating the data packet, forwarding the data packet to an output port of the communication device, performing error correction operations, converting the format of the data packet and the like.

Some of the communication devices are required to operate at wire-speed. Even communication devices that operate at sub-wire speed have to operate relatively quickly. In addition, these communication devices are required to be cost effective and to manage data packets that may includes relatively large control information fields.

For example, a typical communication switch can be required to process data packets that include layer two and even layer 3, 4, and/or 7 control information fields that can be up to sixty-four bits long. Future communication protocols may require even longer control information fields. Typical control information fields include source address, destination address, and the like.

Typically, one or more control information fields is used to form a key, the key is used to access a first data structure that usually includes a pointer to another data structure that in turn includes information that defines how to process the data packet.

One prior art device stored the first data structure in a content addressable memory (CAM). This solution is very costly, especially when the CAM stores the complete key and when the CAM is used to store a very large number of keys. Yet another solution involves storing the first data structure in an off-chip static random access memory (SRAM) unit. SRAM are very fast but are also expensive. Yet another solution involves storing the first data structure in an on-chip memory unit while consuming expensive VLSI area.

Yet another prior art solution involved applying a hash function on the key to provide a hashed value. The hashed value is used to access the first memory data structure efficiently. The hash function maps a very large virtual memory space spanned by the key to a much smaller memory space. This mapping can result in a collision—multiple different keys that are have the same hashed value. Collisions can be solved by allocating a set of memory entries for each hashed value. This solution is also referred to as chaining. Each memory entry of the set stores a key. When a new key is mapped to a hashed value the set of memory entries is scanned in order to find a vacant memory entry. Once such a vacant entry is found the key is stored in it.

Yet another solution for the collision problem involves allocating the next vacant memory entry to a colliding key. Yet a further solution involves using a second hash table for the colliding keys.

U.S. Pat. No. 5,339,398 of Shah et al., titled "Memory architecture and method of data organization optimized for hashing", which is incorporated herein by reference, describes the chaining solution as well as a dual memory structure in which a first memory serves as a hash index table, for storing pointers at each address location corresponding to a hash value generated by hashing a key data word. Each pointer is the address of a location in a second memory, which has a separate storage location for each key data word, its associated data, and a further pointer which is the address of the next key data word resulting from a collision during hashing.

U.S. patent application 2003/0210689 of Davis et al., titled "Lookups by collision-less direct tables and CAMs", which is incorporated herein by reference, describes a structure and technique for preventing collisions using a hash table in conjunction with a CAM to identify and prevent a collisions of binary keys. A portion of the hash value of a binary key, which does not collide with a portion of the hash value of any other reference binary key, is used as an entry in the hash table. If two or more binary keys have identical values of the portions of the hash values, each of these binary keys are stored in their entirety, in the CAM. The key in the CAM provides a pointer to a data structure where the action associated with that binary key is stored. If the binary key is not found in the CAM, the binary key is hashed, and a specific entry in the hash table is selected using a portion of this hash value.

U.S. patent application 2005/0114547 of Wu et al., titled "Network address and port number translation system" which is incorporated herein by reference, describes a network address and port number translation (NAPT) system which applies hashing to search data and uses a data store pool to resolve collision on searching. In addition, a list header and the data store pool form a list of free public port numbers, such that a first available free (not used) public port number can be taken from the list header while a new connection is set up.

U.S. Pat. No. 6,950,434 of Viswanath et al., titled "Arrangement for searching packet policies using multi-key hash searches in a network switch" which is incorporated herein by reference, describes a network switch, configured for performing layer 2 and layer 3 switching in an Ethernet network without blocking of incoming data packets. The network switch includes network switch ports, each including a flow module configured for generating a packet signature based on layer 3 information within a received data packet. The flow module generates first and second hash keys according to a prescribed hashing function upon obtaining first and second portions of layer 3 information. The flow module combines the first and second hash keys to form the packet signature, and searches an on-chip signature table that indexes addresses of layer 3 switching entries by entry signatures, where the entry signatures are generated using the same prescribed hashing function on the first and second layer 3 portions of the layer 3 switching entries.

U.S. Pat. No. 6,925,085 of Krishna et al. titled "Packet classification using hash key signatures generated from interrupted hash function" which is incorporated herein by reference describes a network switch, configured for performing layer 2 and layer 3 switching in an Ethernet network without blocking of incoming data packets. The network switch includes network switch ports, each including a packet classifier module configured for generating a packet signature based on information within a received data packet and hash action values specified within a user-programmable template. In particular, the network switch stores a plurality of user-programmable templates, each configured for identifying a corresponding class of data packet. Each user-programmable template includes hash action values specifying initiation and termination of a hash function based on a byte offset of a received data packet. The packet classifier module includes a hash generator configured for generating hash values for selected bytes of the received data packet, and a template translator configured for controlling the hash generator for hashing the selected bytes of the received data packet based on the hash action values specified by a corresponding user-programmable template. A unique hash signature can be generated by supplying a data frame having a prescribed data values at the selected bytes of the user-programmable template. The hash signature can then be stored for comparison with incoming data packets during network switching operations. Hence, data packets can be classified at the wire rate by performing a hash-based search of selected bytes of the received data packet.

U.S. Pat. No. 6,889,225 of Cheng et al., titled "Large database search using content addressable memory and hash", which is incorporated herein by reference describes a hash-CAM (H-CAM) which may work with a controller and a memory containing a database of either search values and associate content or associate content by itself. The H-CAM includes at least one set of paired hash units and CAM units and at least one logic unit. The CAM units hold values known to cause hash collisions in the respectively paired hash units, and the logic unit prioritizes the hash and CAM unit outputs to a single address value usable to access the memory and obtain a search result at the controller that is not the result of a hash collision. The H-CAM may optionally include a search data storage to store the search values, so that they need not be stored in the memory, and a comparator to determine and handle newly determined hash collisions.

Additional hashing mechanism are illustrated in the following articles, all being incorporated herein by reference: "Balanced allocation", Yossi Azar, Andrei Z. Broder, Anna R. Karlin, Eli Upfal, Proceedings of 26th STOC (1994), 593-602; "Expected length of the longest probe sequence in hash code searching", G. H. Gonnet, J. Assoc. Comput. Mach., 28 (1981):289-304; and "How Asymmetry Helps Load Balancing", B. Vöcking, Proc. 40th FOCS (New York, 1999), pp. 131-140.

There is a growing need to provide efficient devices and method for processing data packets.

SUMMARY OF THE INVENTION

According to various embodiments of the invention a method is provided. The method includes: receiving a key associated with the data packet; applying multiple hash functions to provide multiple hashed values; accessing a group of hash tables using the multiple hashed values; determining a data packet processing operation in response to a content of accessed entries of the multiple hash tables.

According to various embodiments of the invention a method is provided. The method includes: receiving a key; applying multiple hash functions to provide multiple hashed values; accessing a group of hash tables using the multiple hashed values; associating between the key and an accessed vacant entry of a hash table out of the group of has tables.

According to various embodiments of the invention a device is provided. The device includes a communication controller connected to at least one memory bank; wherein the communication controller is adapted to receive a key associated with a data packet, apply multiple hash functions to provide multiple hashed values; access a group of hash tables stored within the at least one memory bank, using the multiple hashed values; and determine a data packet processing operation in response to a content of accessed entries of the multiple hash tables.

According to various embodiments of the invention a device is provided. The device includes a communication controller coupled to at least one memory bank; wherein the communication controller is adapted to receive a key, apply multiple hash functions to provide multiple hashed values; access a group of hash tables using the multiple hashed values; and associate between the key and an accessed vacant entry of an hash table out of the group of has tables.

According to an embodiment of the invention a method for providing a search result is provided. The method includes: receiving a key, applying multiple hash functions to provide multiple hashed values; accessing a group of hash tables using the multiple hashed values; providing a search result in response to a content of at least one accessed entries of multiple accessed entries of the multiple hash tables.

BRIEF DESCRIPTION OF THE DRAWINGS

The invention is herein described, by way of example only, with reference to the accompanying drawings, wherein.

DETAILED DESCRIPTION

Figure 1:
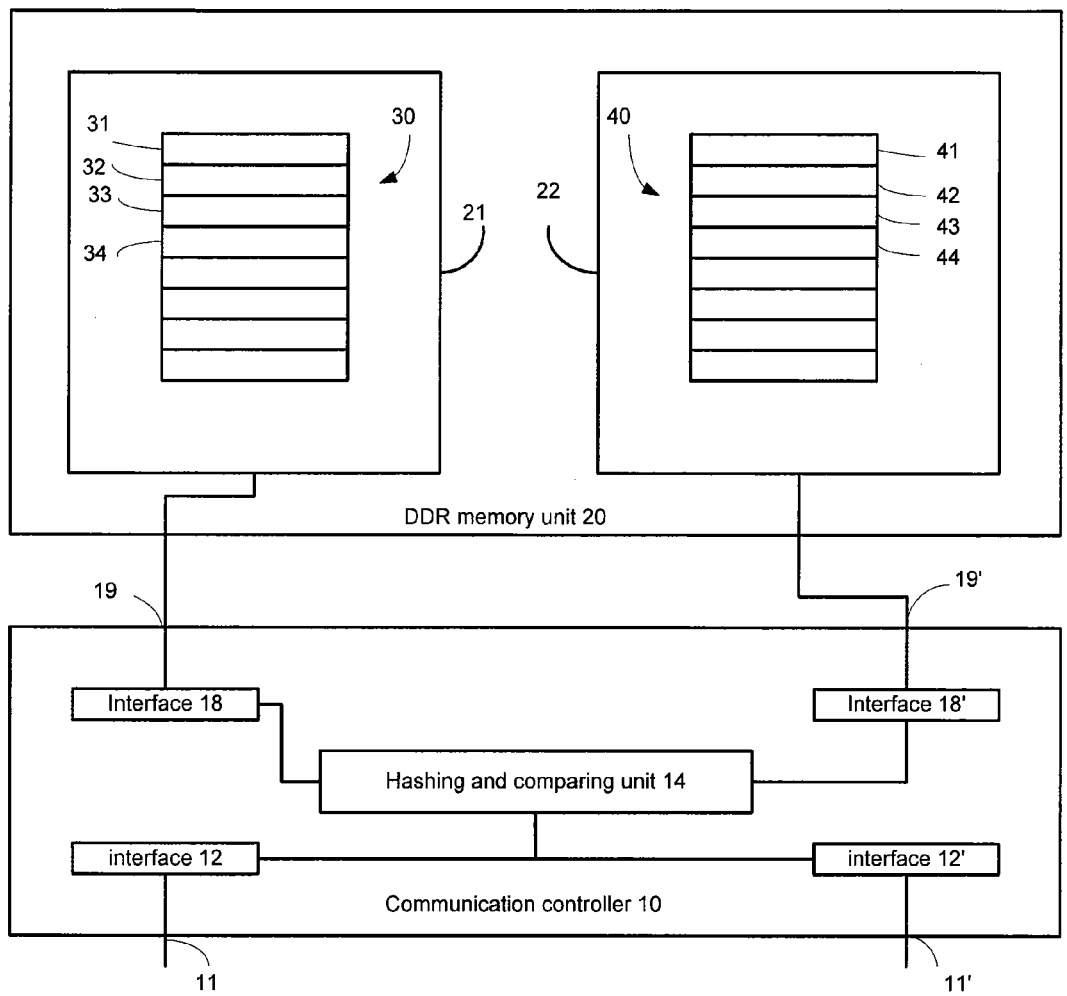
FIG. 1 illustrates a device according to an embodiment of the invention.

A method and device for processing data packets are provided. Conveniently, the device and method apply multiple hash functions on a key to provide multiple hashed values. These multiple hashed values are used to access multiple hash tables. Conveniently, the multiple hash tables are stored in dynamic memory units, such as but not limited to DDR memory units.

Conveniently, the multiple hash tables are stored in multiple memory banks, especially DDR memory banks. The access to the different memory banks is staggered such that while one or more memory banks are accessed one or more other memory banks are refreshed, thus increasing the utilization of the memory unit.

DDR memories are cheaper than SRAMs and are also subjected to extensive development efforts, due to their importance to the personal computer market. Thus it is expected that their performances will increase while their cost will decrease.

Conveniently, one or more DDR memory units are partitioned to multiple memory banks, each storing a hash tables, and each hash table is accessed by a hashed value that is generated by applying a unique hash function. Different hash tables are accessed by hashed values generated by applying different hash functions.

Conveniently, collisions are managed by accessing different hash tables. If the usage of multiple hash tables is not sufficient additional solutions can be applied. These additional solutions can include at least one of the following solutions, as well as a combination of two or more of these solutions: chaining, using a CAM, assigning another memory entry to a colliding key, overwriting existing entries, and the like.

The inventors found that using multiple hash tables within multiple memory banks solves most cases of collisions and that the mentioned above additional solutions are usually required for solving a relatively small amount of unsolved collisions. For example, a sixteen-entry CAM unit can usually manage unsolved collisions when there are 32,000 hash table entries, and a commodity DDR size is used.

Conveniently, when a new key is provided to the device it simultaneously generates multiple hashed values, accesses multiple hash tables and reads the content of the corresponding hash table entries. If the value does not exist in any of the hash table entries the key can be inserted to the hash table entry with the smallest number of items. In the special case where the hash table depth is one, one of the empty hash table entries can be selected in a random manner. In a better instantiation of this process, the empty hash table is selected according to a fixed priority order of the tables.

It is noted that more than a single hash table can be stored within a single memory bank, although conveniently a memory bank stores one hash table.

According to an embodiment of the invention if a collision is not solved by using the multiple hash tables and a CAM unit is not full, the colliding key is written to the CAM unit. If the CAM unit is full, then the system and method can determine whether to overwrite a hash table entry or a CAM entry. The selection can be responsive to various selection rules.

According to an embodiment of the invention the selection involves applying a probabilistic process. The process includes selecting at random (with probability Ph) an entry of hash table out of the multiple hash tables. The key is written to the selected hash table entry. The process also includes selecting (with probability Pc, wherein 2Ph+Pc=1) an entry of the CAM unit and writing to this entry the colliding key. It is noted that other relationships between Pc and Ph can exist.

The values of Pc and Ph can be set such as to prefer overwriting entries of the hash tables (smaller Pc values) or to prefer overwriting entries of the CAM unit (larger values of Pc).

According to an embodiment of the invention the entries within at least one hash table and/or the entries of the CAM unit undergo a refreshing process in which old entries are deleted (or can be overwritten). An entry is regarded as an old entry after a predefined expiration period expires. Each hash table can have its own expiration period. Conveniently, the expiration period can be responsive to the number of accesses to that entry.

According to an embodiment of the invention the additional solution includes overwriting existing hash table entries if the hash tables entries that are accessed by the multiple hashed values are not vacant. This solution does not require a CAM unit. Conveniently, flags that indicate empty hash table entries can be used to speed up the insertion process.

According to an embodiment of the invention multiple hash table entries are accessed by using multiple hashed values generated by applying multiple hash functions from the same key. Conveniently, if more than one accessed hash table entry is vacant various selection rules can be applied for selecting between the vacant accessed hash table entries. For example, the selection can apply a random or pseudo random process. Yet for another example the hash tables are sorted in a certain order and the selection can be responsive to the order of the hash tables. Thus, if there are B hash tables and they have hash table identifiers that range between 1 and B then the selection can involve selecting the hash table that has the lowest identifier value, the highest identifier value and the like. The selection can be adapted to evenly (or unevenly) distribute the keys among the different vacant hash tables.

FIG. 1 illustrates device 100 according to an embodiment of the invention.

For simplicity of explanation only a single memory unit that includes two memory banks is illustrated. The number of memory banks can exceed two. The number of memory units can exceed one. The number of hash tables per memory bank can exceed one. The memory unit can differ from a DDR memory unit. It can be another type of dynamic memory unit but this is not necessarily so. Yet for another embodiment of the invention a combination of static and dynamic memory units can be used.

Device 100 includes a communication controller 10 that is connected to a memory unit such as DDR memory unit 20. DDR memory unit 20 includes two memory banks 21 and 22, wherein the first memory bank 21 stores a first hash table 30 and the second memory bank 22 stores a second hash table 40. Each memory bank can be accessed independently. Furthermore, while one memory bank is accesses the second memory bank can be refreshed.

The communication controller 10 includes multiple input/output ports. For simplicity of explanation only two I/O ports (19 and 19') are shown as being connected to the DDR memory unit 20, and only two I/O ports (11 and 11') are illustrated as being connected to additional devices (not shown) for receiving and for outputting data streams.

Communication controller 10 is illustrated as having two data paths, although the number of data paths can exceed two and or be equal to one.

Communication controller 10 includes two interfaces 12 and 12' that are connected to I/O ports 11 and 11' respectively, for receiving and storing data packets on one hand and also for storing and outputting data packets. It is noted that the data paths can include different transmit data path and a receive data path but this is not necessarily so.

Interfaces 12 and 12' are connected to hashing and comparing unit 14. The hashing and comparing unit 14 receives a data packet, generates a key, applies two different hash functions on the key to provide two hashed values, sends the two hashed values to interfaces 18 and 18'. Interface 18 receives a first hashed value and send it via I/O port 19 to memory unit 20 where it is used to access an entry (such as entry 31) of the first hash table 30. The content of that entry (or a content of a group of entries) is sent back to the hashing and comparing unit 14 via I/O port 19 and interface 18.

Interface 18' receives a second hashed value and send it via I/O port 19' to memory unit 20 where it is used to access an entry (such as entry 42) of the second hash table 40. The content of that entry (or a content of a group of entries) is sent back to the hashing and comparing unit 14 via I/O port 19' and interface 18'.

Conveniently, these two access operations are executed in a sequential manner. While the first memory bank 21 is accessed the second memory bank 22 is refreshed and vice verse. Conveniently, if multiple accesses are made per hashed value then the accesses are made in a pipelined manner.

The hashing and comparing unit 14 compares the content of the accessed entries to the generated key. If a match is found than the entry that stored the key is defined as a selected entry. The selected entry either has information indicating how to process the data packet or include a pointer to such information.

If, for example, no match was found then the hashing and comparing unit 14 can determine whether to store the newly generated key in one of the hashing tables.

Figure 2:
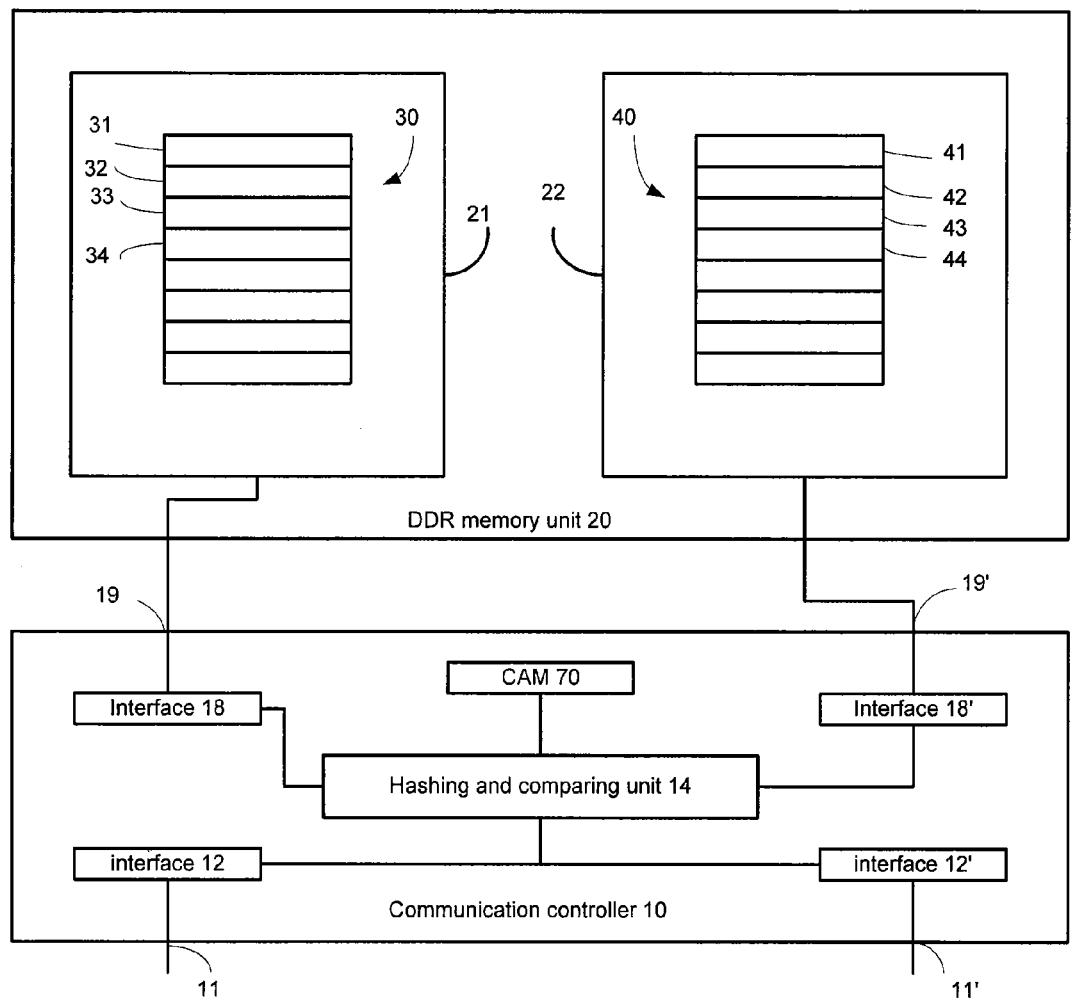
FIG. 2 illustrates a device according to another embodiment of the invention.

It is noted that the communication controller 10 can be configures to apply additional solutions to solve collisions. For example, device 100 can include a CAM, such as CAM 70 of FIG. 2 (included within device 100'), that stores colliding keys that cannot be placed in hash table entries. Yet for another example, device 100 can overwrite full hash table entries. Yet for a further example, device 100 can use chaining and the like. Referring to FIG. 1, chaining can include allocating a set of entries (such as entries 31-34) to each hashed value and filling up the set of entries by colliding keys, until the set is filled.

Figure 3:
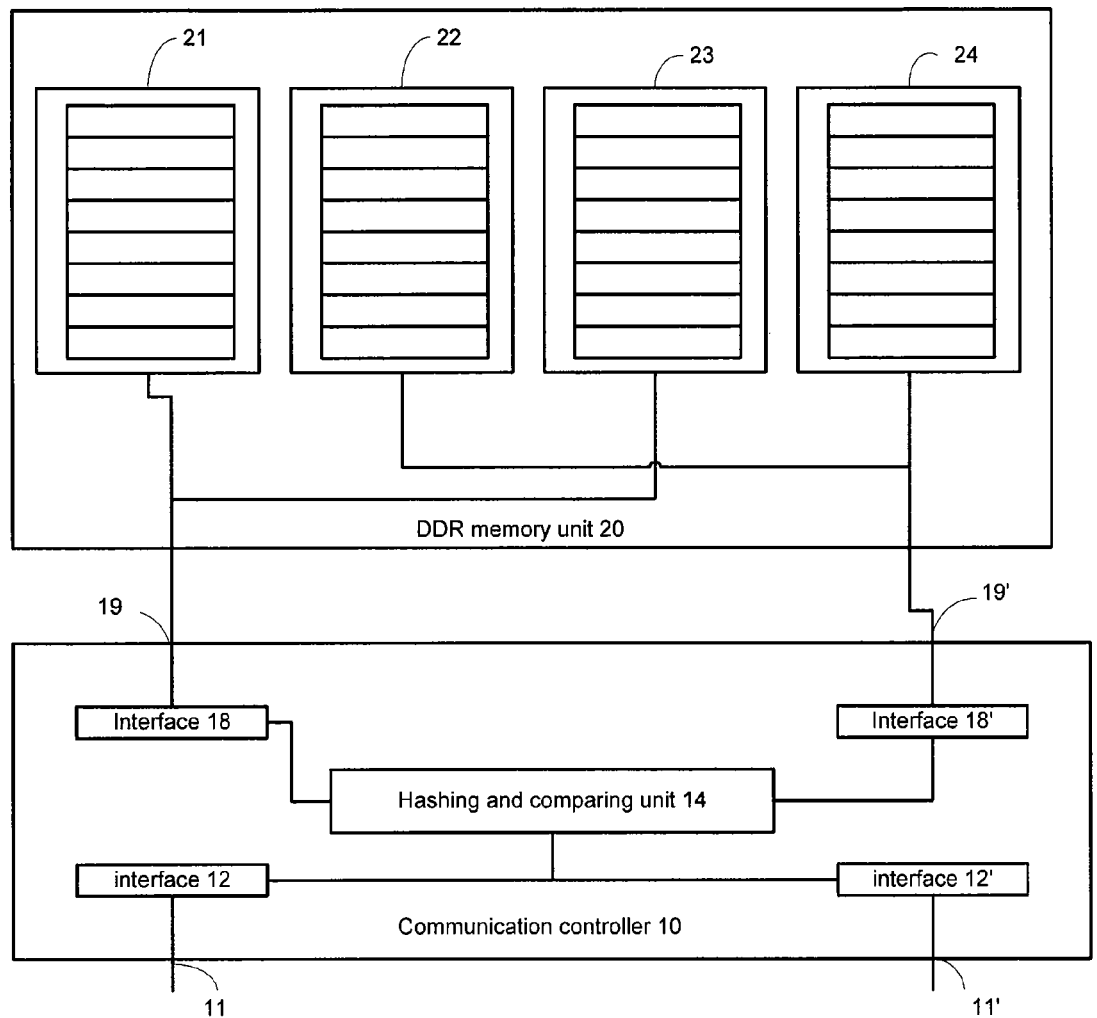
FIG. 3 illustrates a device according to a further embodiment of the invention.

FIG. 3 illustrates a device 100" according to a further embodiment of the invention.

Device 100" includes four different memory banks 21-24, stored within a single DDR memory unit 20'. The even memory banks (22 and 24) can be accessed in parallel while the odd memory banks (21 and 23) are refreshed and vice verse. It is noted that other combinations of memory banks can be accesses concurrently.

Figure 4:
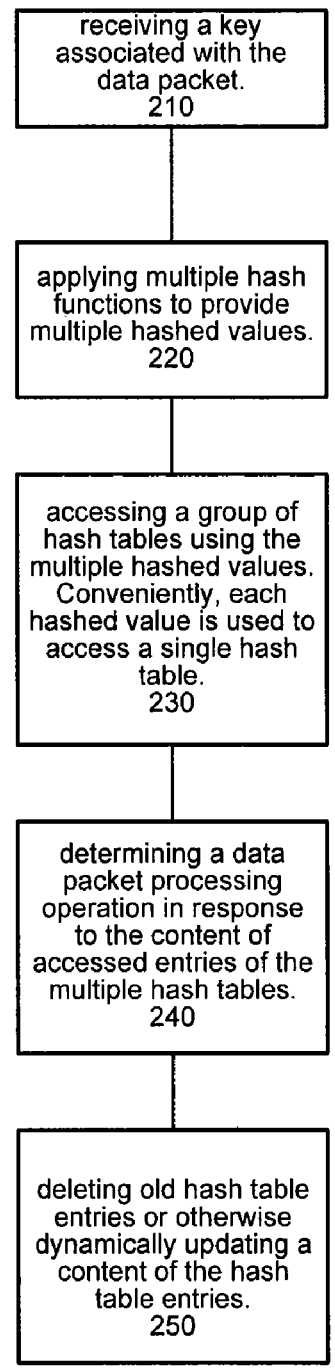
FIG. 4 is a flow chart of a method for processing a data packet according to an embodiment of the invention.

FIG. 4 is a flow chart of method 200 for processing a data packet according to an embodiment of the invention.

Method 200 starts by stage 210 of receiving a key associated with the data packet. Stage 210 may include extracting information control fields from the data packet and generating a key, manipulating information stored in the data packet to provide the key and the like.

Stage 210 is followed by stage 220 of applying multiple hash functions to provide multiple hashed values. Conveniently, the hash functions differ from each other.

Stage 220 is followed by stage 230 of accessing a group of hash tables using the multiple hashed values. Conveniently, each hashed value is used to access a single hash table.

Conveniently, stage 230 of accessing includes accessing different hash tables that are being stored in different memory banks.

Conveniently, stage 230 of accessing includes accessing different hash tables that are being stored in different dynamic memory banks.

Conveniently, stage 230 of accessing includes accessing at least one hash table stored in at least one dynamic memory bank while refreshing at least one other dynamic memory bank that stores at least one other hash table.

Conveniently, stage 230 also includes searching the key in a content addressable memory. The search can be executed in parallel to the access to the hash tables.

Stage 230 is followed by stage 240 of determining a data packet processing operation in response to the content of accessed entries of the multiple hash tables. If a hash table entry stores the key then the action is selected in response to the content of that entry. For example if the entry also stores an output port number, a flow identifier and the like then this stored information is used during the forwarding of the data packet. Yet for another example the hash table entry can point to a data structure that is processed in order to determine how to manage the data packet, and the like.

Conveniently, stage 240 includes retrieving a data structure associated with an accessed hash table entry if the hash table entry stores the key.

Stage 240 can be followed by stage 250 of deleting old hash table entries or otherwise dynamically updating a content of the hash table entries. Stage 250 can be executed in parallel to any stage out of stages 210-240.

Figure 5:
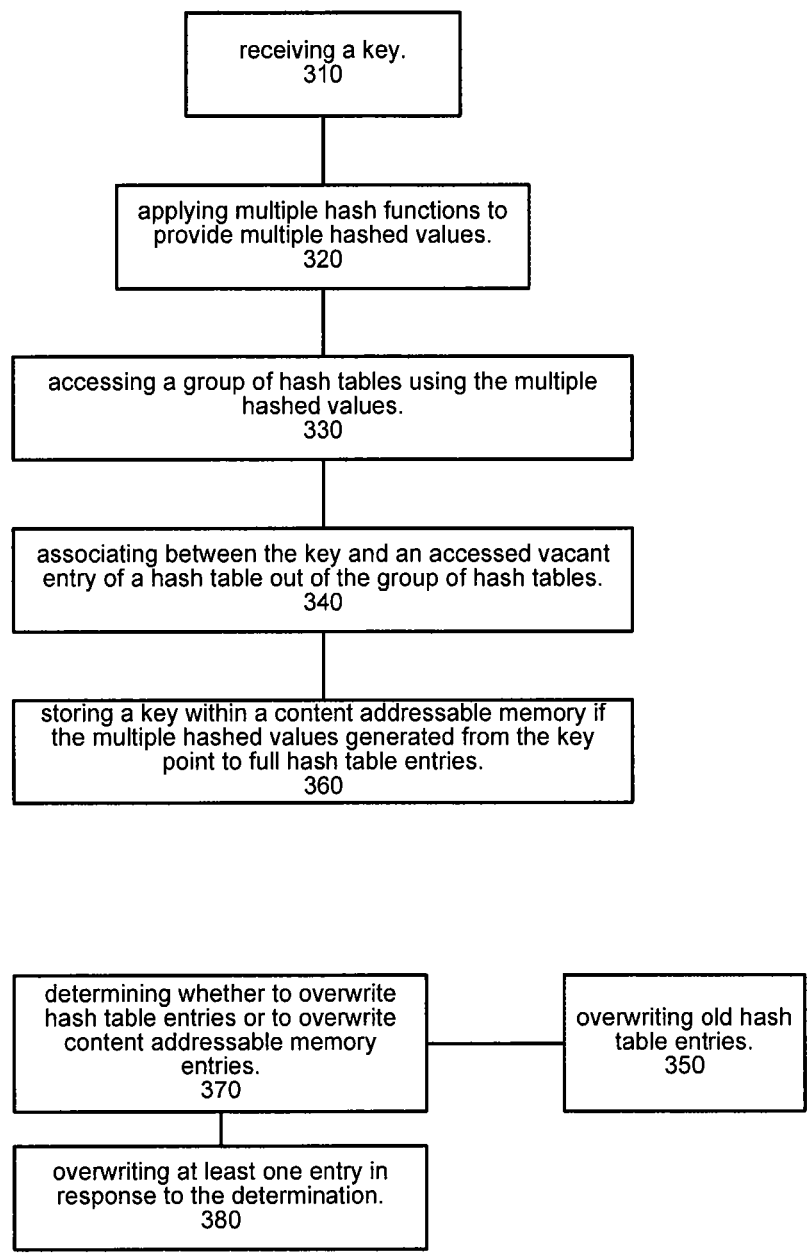
FIG. 5 is a flow chart of a method for generating multiple hash tables according to an embodiment of the invention.

FIG. 5 is a flow chart of a method 300 for generating multiple hash tables according to an embodiment of the invention.

Method 300 starts by stage 310 of receiving a key.

Stage 310 is followed by stage 320 of applying multiple hash functions to provide multiple hashed values.

Stage 320 is followed by stage 330 of accessing a group of hash tables using the multiple hashed values.

Stage 330 may include accessing multiple hash tables stored within different memory banks, accessing multiple hash tables stored within different dynamic memory banks, accessing at least one hash table stored in at least one dynamic memory bank while refreshing at least one other dynamic memory bank that stores at least one other hash table, and the like.

Stage 330 is followed by stage 340 of associating between the key and an accessed vacant entry of a hash table out of the group of hash tables. Conveniently, each hashed value is used to access a set of hash table entries. If one or more hash table entries are full the key can be associated with a remaining vacant hash table entry. This usage can include allocating a set of hash table entries per hash value.

Conveniently, method 300 includes stage 350 of overwriting old hash table entries. Stage 350 can follow stage 340 and can be executed in parallel to any stage of stage 210-240.

Conveniently, stage 340 is followed by stage 360 of storing a key within a content addressable memory if the multiple hashed values generated from the key point to full hash table entries.

Figure 6:
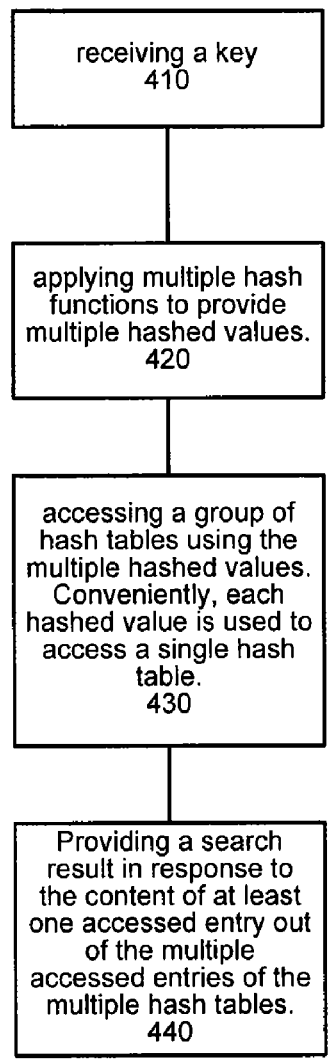
FIG. 6 is a flow chart of a method for providing a search result according to an embodiment of the invention.

Conveniently, method 300 includes stage 370 of determining whether to overwrite hash table entries or to overwrite content addressable memory entries. Stage 370 can be followed by stage 380 of overwriting at least one entry in response to the determination. FIG. 6 is a flow chart of method 400 for providing a search result according to an embodiment of the invention.

Method 400 starts by stage 410 of receiving a key.

Stage 410 is followed by stage 420 of applying multiple hash functions to provide multiple hashed values.

Stage 420 is followed by stage 430 of accessing a group of hash tables using the multiple hashed values.

Stage 430 is followed by stage 440 of providing a search result in response to a content of at least one accessed entries of multiple accessed entries of the multiple hash tables.

While the invention has been described with respect to a limited number of embodiments, it will be appreciated that many variations, modifications and other applications of the invention may be made.

What is claimed is:

1. A method for processing a data packet, the method comprises:
receiving a key associated with the data packet; applying multiple hash functions to provide multiple hashed values; accessing a group of hash tables using the multiple hashed values; determining a data packet processing operation in response to a content of accessed entries of the multiple hash tables;
wherein the accessing comprises accessing, in a sequential manner, different hash tables that are being stored in different memory banks; wherein at least one of the memory banks is a dynamic memory bank; and wherein the accessing comprises accessing at least one hash table stored in at least one memory bank while refreshing at least one dynamic memory bank that stores at least one other hash table;
wherein the method further comprises refreshing at least one hash table by deleting or overwriting an old entry for which a predefined expiration period expired.

2. The method according to claim 1 further comprising searching the key in a content addressable memory.

3. The method according to claim 1 wherein the determining comprises retrieving a data structure associated with an accessed hash table entry if the hash table entry stores the key.

4. The method according to claim 1 wherein each hash table out of the multiple hash table has its own expiration period.

5. The method according to claim 1 further comprising dynamically updating a content of the hash table entries.

6. The method according to claim 1, wherein the expiration period of the old entry is responsive to a number of accesses to that entry.

7. A method for generating multiple hash tables, the method comprises: receiving a key; applying multiple hash functions to provide multiple hashed values; accessing a group of hash tables using the multiple hashed values; associating between the key and an accessed vacant entry of an hash table out of the group of hash tables; and determining whether to overwrite a hash table entry or to overwrite a content addressable memory entry, by applying a probabilistic process that comprises: assigning a probability Pc to overwrite an entry of the content addressable memory and assigning a probability Ph to overwrite an entry of each of the multiple hash tables; and
wherein the accessing comprises accessing different hash tables that are being stored in different memory banks; wherein at least one of the memory banks is a dynamic memory bank; and wherein the accessing comprises accessing at least one hash table stored in at least one memory bank while refreshing at least one dynamic memory bank that stores at least one other hash table.

8. The method according to claim 7 further comprising allocating a set of hash table entries per hash value.

9. The method according to claim 7 further comprising overwriting old hash table entries.

10. The method according to claim 7 further comprising storing a key within a content addressable memory if the multiple hashed values generated from the key point to full hash table entries.

11. The method according to claim 10 further comprising overwriting at least one entry in response to the determination.

12. The method according to claim 7, wherein the applying of the probabilistic process comprises assigning the probability Pc that is a non-zero probability which is smaller than 1 and assigning the probability Ph that is a non-zero probability that is smaller than 1.

13. A device comprising a communication controller coupled to at least one memory bank; wherein the communication controller is adapted to receive a key associated with a data packet; apply multiple hash functions to provide multiple hashed values; access a group of hash tables stored within the at least one memory bank, using the multiple hashed values; and determine a data packet processing operation in response to a content of accessed entries of the multiple hash tables;
wherein the communication controller is adapted to access, in a sequential manner, multiple hash tables stored within different memory banks; wherein at least one of the memory banks is a dynamic memory bank; and wherein the communication controller is adapted to access at least one hash table stored in at least one memory bank while refreshing at least one dynamic memory bank that stores at least one other hash table;
wherein the entries in at least one hash table undergo a refreshing process that comprises deleting or overwriting an old entry of the hash table for which a predefined expiration period expired.

14. The device according to claim 13 wherein the communication controller is adapted to search the key in a content addressable memory.

15. The device according to claim 13 wherein the communication controller is adapted to retrieve a data structure associated with an accessed hash table entry if the hash table entry stores the key.

16. The device according to claim 13 wherein the communication controller is adapted to delete old hash table entries.

17. The device according to claim 13 wherein the communication controller is adapted to dynamically update a content of the hash table entries.

18. A device comprising a communication controller coupled to at least one memory bank; wherein the communication controller is adapted to receive a key; apply multiple hash functions to provide multiple hashed values; access a group of hash tables using the multiple hashed values; associate between the key and an accessed vacant entry of an hash table out of the group of hash tables, wherein the association is responsive to a hash table with a smallest number of items;
wherein the communication controller is adapted to access multiple hash tables stored within different memory banks; wherein at least one of the memory banks is a dynamic memory bank; and wherein the communication controller is adapted to access at least one hash table stored in at least one memory bank while refreshing at least one dynamic memory bank that stores at least one other hash table;
wherein the entries in at least one hash table undergo a refreshing process that comprises deleting or overwriting an old entry of the hash table for which a predefined expiration period expired.

19. The device according to claim 18 wherein the communication controller is adapted to allocate a set of hash table entries per hash value.

20. The device according to claim 18 wherein the communication controller is adapted to overwrite old hash table entries.

21. The device according to claim 18 wherein the communication controller is adapted to write a key within a content addressable memory if the multiple hashed values generated from the key point to full hash table entries.

22. The device according to claim 18 wherein the communication controller is adapted to determine whether to overwrite hash table entries or to overwrite content addressable memory entries, and overwrite at least one entry in response to the determination.

23. A method for generating multiple hash tables, comprising: receiving a key; applying multiple hash functions to provide multiple hashed values; accessing a group of hash tables using the multiple hashed values; associating between the key and an accessed vacant entry of an hash table out of the group of hash tables; and determining by a communication controller whether to overwrite a hash table entry or to overwrite a content addressable memory entry, by applying a probabilistic process that comprises: assigning a probability Pc to overwrite an entry of the content addressable memory and assigning a probability Ph to overwrite an entry of each of the multiple hash tables.

24. The method according to claim 23 wherein the assigning of probabilities comprises setting values of Pc and Ph such as to prefer overwriting entries of the multiple hash tables.

* * * * *